United States Patent [19]

Rigler et al.

[11] 4,418,156

[45] Nov. 29, 1983

[54] FIRE RETARDANT FINE PARTICULATE EXPANDABLE STYRENE POLYMERS

[75] Inventors: Josef K. Rigler, Recklinghausen; Ekkehard Wienhöfer, Marl; Horst Leithäuser, Marl; Karl Trukenbrod, Marl, all of Fed. Rep. of Germany

[73] Assignee: Chemische Werke Hüls AG, Marl, Fed. Rep. of Germany

[21] Appl. No.: 486,429

[22] Filed: Apr. 19, 1983

Related U.S. Application Data

[62] Division of Ser. No. 380,070, May 20, 1982, Pat. No. 4,393,146.

[30] Foreign Application Priority Data

Jun. 5, 1981 [DE] Fed. Rep. of Germany ....... 3122342

[51] Int. Cl.$^3$ .............................. C08J 9/20; C08J 9/22
[52] U.S. Cl. ......................................... 521/56; 264/53; 264/DIG. 9; 264/DIG. 15; 521/58; 521/90; 521/146; 521/907
[58] Field of Search ..................... 521/56, 58, 90, 146, 521/907; 264/53, DIG. 9, DIG. 15

[56] References Cited

U.S. PATENT DOCUMENTS

| | | |
|---|---|---|
| 3,755,209 | 8/1973 | Wintz et al. |
| 4,029,614 | 6/1977 | Wintz et al. |
| 4,192,922 | 3/1980 | Wintz et al. |
| 4,223,244 | 10/1980 | Rigler et al. |
| 4,281,036 | 7/1981 | Leithausen et al. |

OTHER PUBLICATIONS

R. Wegler, "Polyaddition and Polmerization Products of Heterocyclic Monomers", (1963), pp. 447–450.

*Primary Examiner*—Morton Foelak
*Attorney, Agent, or Firm*—Wells & Wells

[57] ABSTRACT

Fire retardant, expanded styrene polymer shaped objects are prepared by:

(a) mixing styrene monomer or a mixture thereof with at least one comonomer, an expanding agent and a fire retardant, organic halogen compound in a aqueous dispersion;

(b) adding to (a) either before or during polymerization from about 0.0001 to 0.1 percent by weight esters soluble in the organic phase of (a), these esters of aliphatic dicarboxylic acids and aliphatic epoxy alcohols having at least 11 carbon atoms;

(c) polymerizing the aqueous dispersion of (a) and (b) using radical forming initiators at a temperature of about 80° to 130° C.;

(d) separating bead polymers having diameters between about 0.4 and 3 mm;

(e) pre-foaming the beads;

(f) ageing the pre-foamed beads; and (g) final forming the aged and pre-foamed beads in a pressure resistant mold.

4 Claims, No Drawings

FIRE RETARDANT FINE PARTICULATE EXPANDABLE STYRENE POLYMERS

This is a division of application Ser. No. 380,070, filed May 20, 1982 U.S. Pat. No. 4,393,146, July 12, 1983.

CROSS-REFERENCES TO RELATED APPLICATIONS

Applicants claim priority under 35 USC 119 for application P 31 22 342.7, filed June 5, 1981 in the Patent Office of the Federal Republic of Germany.

The disclosure of assignee's copending application Ser. No. 206,282 filed Nov. 12, 1980 is incorporated herein to further show the state of the art of self extinguishing fine particulate expandable styrene polymers.

BACKGROUND OF THE INVENTION

The field of the invention is fire retardant, fine particulate, expandable styrene polymers for the preparation of molded articles. The present invention is particularly concerned with expandable, particulate molding compositions of styrene polymers containing organic halogen compounds and esters of aliphatic dicarboxylic acids and aliphatic epoxy alcohols.

The state of the art of expandable polystyrene may be ascertained by reference to the Kirk-Othmer, "Encyclopedia of Chemical Technology," 2nd Edition, Vol. 9 (1966) under the section entitled "Foamed Plastics," pages 847–884, particularly pages 852, 853 and 855 where polystyrene is disclosed, and Vol. 19 (1969) under the section entitled "Styrene Plastics," pages 85–134, particularly pages 116–120, where polystyrene foams are disclosed and pages 120, 121 where prior art self-extinguishing polystyrene foams are disclosed and U.S. Pat. Nos. 3,755,209; 4,029,614; 4,192,922; 4,228,244 and 4,281,036 the disclosures of which are incorporated herein.

The preparation of the esters of aliphatic dicarboxylic acids and aliphatic epoxy alcohols used in the present invention is disclosed by R. Wegler in METHODEN DER ORGANISCHEN CHEMIE, Vol. XIV, p. 549 as published by Houben Weyl in 1963.

Foamed shaped articles are produced commercially by expanding fine particulate, expandable styrene polymers in molds. In this procedure the fine particulate styrene polymers are first heated with steam or hot gases to temperatures above their softening point, whereby foaming into discrete particles is achieved. This procedure wherein the particles have enough room for free expansion, is termed pre-foaming. The pre-foamed styrene polymers first are stored and then are expanded in a pressure resistant though not gas tight mold by renewed heating with steam, so that the particles fuse together into a shape corresponding to the inside cavity of the mold. This shaping is determined by the spatial bounds of the mold. This section procedure is termed final foaming. The molded object, after final foaming, is cooled inside the mold until the inside temperature drops below the softening point. When the molded object is prematurely removed from the mold, the object deforms. As foam plastics are good insulators, relatively long cooling times are required to cool the mold. The time interval allowing the earliest removal of the molded object without deformation is ordinarily called the "minimum mold dwell time." The drop in the inside pressure to nearly atmospheric can also be used as a criterion for removability from the mold. After being removed from the mold, the molded object typically is stored or aged for some time until cooled entirely and then the shaped articles are cut into foam panels for use as thermal insulation.

Molded products with irregular cell structures are obtained from the final forming of the expandable styrene pre-foamed polymers, especially when a flame retardant halogen compound is added. After having been removed from the mold for a period of time these foamed blocks not only tend toward a substantial collapsing of their sides, called block shrinkage, but also are less firmly fused inside the block. As a result, foam panels cut from such a block are of different qualities. Also, it is necessary to trim the blocks having collapsed sides, and therefore an undesired waste is incurred.

Another problem arises during pre-foaming, because part of the pre-foaming beads shrink, so that low densities desired cannot be controlled. The shrinkage of the pre-foaming beads is related to a high loss in expanding agent, whereby the above mentioned uneven fusing and hence the collapse of the block sides are facilitated. Moreover the surface of the finished parts takes on an uneven appearance, which is bothersome especially as regards the manufacture of panels which are visible to the public.

U.S. Pat. No. 3,755,209 discloses that the addition of hydroxylamines to expandable styrene polymers made to be self-extinguishing by organic halogen compounds will improve the above mentioned processing problems. U.S. Pat. No. 4,029,614 describes a similar effect by adding slight amounts of amines free of hydroxyl groups and U.S. Pat. No. 4,192,922 defines amine-substituted triazine derivatives used to remedy these processing problems.

While in many cases all of these additives clearly improve the product properties, they still fail to provide fully satisfactory products. The poor reproducibility of the product properties is most bothersome of all.

SUMMARY OF THE INVENTION

Having in mind the limitations of the prior art it is an object of the present invention to provide additive compounds which at low concentrations prevent the occurrence of these limitations such as uneven cellularity, fusing and block shrinkage. Furthermore these additives are not to be degraded in their effectiveness by the polymerization auxiliaries required for manufacture, such as initiators, suspension auxiliaries or by other additives such as flame proofing agents and expanding agents, whereby the reproducable product quality is achieved.

It has now been discovered that esters of aliphatic dicarboxylic acids and aliphatic epoxy alcohols, which are soluble in styrene monomers and comonomers and having the total carbon number comprising at least 11 C atoms, favorably affect the significant processing properties of "fusing quality" and "block shrinkage" of foam blocks made of expandable styrene polymers containing organic halogen compounds. These blocks produced are free of the drawbacks described in relation to the addition of amines. The styrene polymers of the present invention evince more processing latitude, that is, foam blocks with good fusing and excellent surface qualities are always obtained for variable steam pressures when final foaming in the mold.

According to the present invention, fire retardant, expanded styrene polymer shapes are prepared by:

(a) mixing styrene monomer or a mixture thereof with at least one comonomer, an expanding agent and a fire retardant, organic halogen compound in an aqueous dispersion;

(b) adding to (a) either before or during polymerization from about 0.0001 to 0.1 percent by weight based on the weight of the monomers of (a) of esters soluble in the organic phase of (a), these esters of aliphatic dicarboxylic acids and aliphatic epoxy alcohols having at least 11 carbon atoms;

(c) polymerizing the aqueous dispersion of (a) and (b) using radical forming initiators at a temperature of about 80° to 130° C.;

(d) separating bead polymers having diameters between about 0.4 and 3 mm;

(e) pre-foaming the beads;

(f) ageing the pre-foamed beads; and (g) final forming the aged and pre-foamed beads in a pressure resistant mold.

DESCRIPTION OF THE PREFERRED EMBODIMENTS

The epoxy esters according to the present invention include the bis-glycidylesters of glutaric acid, adipic acid, pimelic acid, suberic acid and azelaic acid as well as the bis-glycidylesters of sebacic acid of dodecanoic diacid and brassylic acid, in particular dodecanoic-diacid-bis-glycidylester. Due to their better solubility in styrene, branched-chain bis-glycidylesters of the dicarboxylic acids such as 2,2,4-trimethyl-adipic-acid are preferred.

No protection is sought for the production of the epoxidation products, which takes place according to prior art methods, for instance by reacting the corresponding acid salts with epichlorohydrin as disclosed by R. Wegler, in METHODEN DER ORGANISCHEN CHEMIE, Vol. XIV, p 549 (1963) and published by Houben Weyl.

A suitable method for preparing the styrene polymers of the present invention containing an organic halogen compound and an expanding agent is carried out for example by polymerizing styrene and possibly comonomers in an aqueous suspension using radical-forming initiators at temperatures in excess of 80° C. The polymerization is carried out in the presence of the flame retardant organic halogen compounds and the expanding agents, the epoxidation product soluble in the organic phase of the suspension being added before or during the polymerization.

It appears that a good solubility of the organic halogen compound, flame proofing agent, in the ester of an aliphatic dicarboxylic acid and an aliphatic epoxy alcohol is helpful. Not only does it provide for good solubility in the organic phase of the suspension but also in the effectiveness of the esters.

The esters of the present invention are used in proportions from about 0.0001 to 0.1, preferably however from 0.001 to 0.05 percent by weight referred to the monomers to be polymerized. In every instance the amount to be used, measured with respect to the amount of the halogen compound added, is slight. The substances can be added either to the organic phase or to the reaction mixture before or during the polymerization up until almost the end of the polymerization. An ester addition during the polymerization at a conversion of about 50 to 90% and possibly an addition together with the expanding agent is preferred. The amount of the ester and the time of addition are independent of the temperature profile of the polymerization and of the kind of initiator used respectively. On the other hand the amount and the kind of ester depend on the kind of halogen compound incorporated, and this is easily ascertained empirically.

The raw materials for the production of the styrene polymers of the present invention can be mixtures of monomers containing at least 50% by weight of styrene and possibly as copolymerization components for instance alphamethylstyrene, nuclear-halogenated styrenes, acrylonitrile, esters of acrylic and methacrylic acids with alcohols having 1 to 8 carbon atoms, N-vinyl compounds such as N-vinyl-carbazole, and also slight amounts of butadiene or divinylbenzene.

The polymerization is appropriately carried out by the bead pre-polymerization method as disclosed in U.S. Pat. No. 4,228,244 at temperatures between 80° and 130° C. It is initiated in conventional manner using one or more radical-forming substances, such as t-butyl-perbenzoate, t-butylperoctoate, di-t-butylperoxide, dibenzoylperoxide or their mixtures.

The organic halogen compounds used are preferably bromine compounds such as the brominated oligomers of butadiene or isoprene with an average degree of polymerization between 2 and 20, the bromination being complete or partial as called for. Examples include 1,2,5,6-tetraboromocyclooctane, 1,2,5,6,9,10-hexabromocyclododecane, and brominated polybutadiene with a degree of polymerization for instance from 3 to 15. The organic halogen compounds can be contained in the expandable styrene polymer in proportions of 0.05 to 1% by weight, when added as fire retardant agents in amounts of 0.4 to 3% by weight to the expandable styrene polymer. In addition to using halogen compounds as fire retardant agents, use can be made of synergists in conventional amounts, preferably organic peroxides, especially those having a half-value time of at least 2 hours at 373° K.

Examples of useful suspension stabilizers are organic protective colloids such as polyvinyl alcohol, polyvinyl pyrrolidone or polyvinyl pyrrolidone copolymers or mineral suspension auxiliaries such as finely distributed tricalcium phosphate, barium phosphate etc.

The expanding agents used in the present invention are for example aliphatic hydrocarbons such as propane, butane, pentane, hexane, cycloaliphatic hydrocarbons such as cyclohexane, or halogen hydrocarbons such as dichlorodifluoromethane and 1,2,2-trifluoro-1,1,2-trichloroethane. Mixtures of these compounds are also useful. The proportion of expanding agent is from about 3 to 15% by weight, preferably between 5 and 8% by weight referred to the weight of styrene polymer.

The expandable styrene polymers furthermore may contain such additives as dyes, fillers and stabilizers. After being prepared, they are present in the form of fine particulates, for instance as beads, and as a rule are from about 0.4 to 3 mm in particle diameter. Using the conventional procedure, the pre-foamed particles are final foamed by being heated in molds which are not gas-tight to sinter expandable styrene into foamed shapes of which the dimensions correspond to the inside cavity of the mold used. The styrene polymers of the present invention are processed into extraordinarily dimensionally stable molded shapes. Foamed blocks of $1 \times 1 \times \frac{1}{2}$ m in size following removal from the mold tend only in the slightest manner to have collapsing sides. The foam shapes or blocks are characterized further by especially good fusing of the individual particles. Accordingly they evince an especially good mechanical stability.

SPECIFIC EXAMPLES

In each of the specific examples of Table 1, 100 parts ous steam pressures, into foam blocks. The test values are listed in Table 1. Each example was repeated at least 5 times. The standard deviations are listed next to the test values and are manifestly wider for the control tests than for the specific examples of the present invention.

TABLE 1

| Additive | Amount of Additive % by Weight | Increase in Bulk Weight g/l[1] | Steaming Time Sec.[2] | Steam Pressure Bar[3] | Fusing Degree %[4] | Block Shrinkage %[5] | Block Surface[6] | Cell Structure cells/mm[7] |
|---|---|---|---|---|---|---|---|---|
| 1. Examples of the present invention | | | | | | | | |
| 2,2,4(2,4,4)- Trimethyl adipic acid digylcidylester | 0.005 | 0.4 ± 0.2 | 20 | 1.8 | 90 ± 10 | 0.4 ± 0.2 | Good | 4 to 6 |
| | | | 20 | 1.5 | 80 ± 10 | 0.5 ± 0.3 | Good | 4 to 6 |
| 2. Control tests | | | | | | | | |
| N,N—Dicyclohexylamine | 0.005 | 0.5 ± 0.2 | 20 | 1.8 | 70 ± 30 | 0.5 ± 0.5 | Good | 2 to 10 |
| | | | 20 | 1.5 | 60 ± 40 | 0.7 ± 0.5 | Good | 2 to 10 |
| N—Tetradecylamine | 0.005 | 0.4 ± 0.2 | 20 | 1.8 | 60 ± 40 | 0.8 ± 0.7 | Good | 2 to 10 |
| | | | 20 | 1.5 | 70 ± 20 | 0.6 ± 0.6 | Good | 2 to 10 |
| 2,4-Diamino-6-nonyl-1,3,5-triazine | 0.005 | 0.8 ± 0.4 | 20 | 1.8 | 60 ± 40 | 1.0 ± 0.5 | Good | 10 to 20 |
| | | | 20 | 1.5 | 70 ± 30 | 1.2 ± 0.6 | Good | 10 to 20 |
| Bis-(hydroxiethyl)-dodecylamine | 0.05 | 1.0 ± 0.5 | 20 | 1.8 | 60 ± 40 | 1.5 ± 0.5 | Good | 2 to 10 |
| | | | 20 | 1.5 | 60 ± 40 | 1.3 ± 0.5 | Good | 2 to 10 |

[1]Increase in bulk weight of the prefoamed beads after being pneumatically conveyed into a silo and 24 hour's storage
[2]The steaming time is the time from reaching the stated steam pressure in the block mold until the closing of the steam supply valve
[3]Steam pressure in the block mold
[4]The degree of fusing is the ratio of the number of ruptured particles to the total number of particles × 100 (= %). The object tested is a foam panel 100 × 100 × 5 cm in size
[5]The block shrinkage is the collapse of the sides as measured 24 hours after the manufacture of the block. The block shrinkage is determined by measuring the block thickness from the center of a large side to the opposite side and orthogonally to both. The difference between the inside mold dimension at this location and the block thickness in percent of the inside mold dimension is the block shrinkage
[6]The block surface is judged good when no collapsed beads of a molten appearance can be noted.
[7]For each test, panels were removed from the block at 10 different places and the number of cells is determined microscopically on them. The values listed are always the highest and lowest cell numbers found. The closer these values are, the more homogeneous the cell structure of the block.

by weight of fully desalted water, 100 parts by weight of styrene, 0.4 parts by weight of benzoyl peroxide, 0.1 parts by weight tertiary butylperbenzoate, 0.75 parts by weight of hexabromocyclododecane, 0.30 parts by weight of dicumyl peroxide and the amount of the corresponding epoxy ester listed in Table 1, and dissolved in styrene are placed in a pressure-resistant agitation vessel made of corrosion-proof steel and are stirred while being heated to 90° C. After being maintained 2 hours at 90° C., 5 parts of a 2% aqueous solution of polyvinyl alcohol having a saponification number of 140 are added. After another 2 hours 7 parts by weight of a mixture of 25% by weight of iso-pentane and 75% by weight of n-pentane is added within a period of 10 to 15 minutes. After another hour at 90° C., this mixture is heated to 120° C. and kept at this temperature for 6 hours.

Upon completion of the polymerization cycle, the suspension is cooled, the bead polymer is separated from the aqueous phase, dried and sifted.

The bead fraction between 1 and 2 mm in diameter is prefoamed down to a bulk weight of 15 grams per liter in a continuous agitation prefoamer of the Rauscher type with flowing steam. Then it is stored or aged for 24 hours and thereafter it is final foamed in a block mold of the Rauscher type and 100×100/50 cm in size, at vari-

We claim:
1. In a particulate molding composition for the production of foamed articles consisting essentially of a mixture of an expanding agent, a fire-retardent organic halogen compound and a polymerized styrene monomer or styrene monomer in admixture with comonomers, the improvement comprising said composition containing about 0.0001 to 0.1 percent by weight based on said monomers and comonomers of esters of aliphatic dicarboxylic acids and aliphatic epoxy alcohols, said esters having at least 11 carbon atoms and said esters soluble in said monomers and comonomers.

2. The molding composition of claim 1, wherein said composition contains 0.001 to 0.05 percent by weight of said esters.

3. The molding composition of claim 2, wherein said esters are selected from the group consisting of glutaric acid-bis-glycidylester, adipic acid-bis-glycidylester, pimelic acid-bis-glycidylester, suberic acid-bis-glycidylester, azelaic acid-bis-glycidylester, sebacic acid-bis-glycidylester, dodecanoic-diacid-bis-glycidylester, brassylic acid-bis-glycidylester and 2,2,4(2,4,4)-trimethyl-adipic acid diglycidylester.

4. The molding composition of claim 3, wherein said ester is 2,2,4(2,4,4)-trimethyl adipic acid diglycidylester.

* * * * *